(12) United States Patent
Carter

(10) Patent No.: US 11,038,401 B2
(45) Date of Patent: Jun. 15, 2021

(54) WHEEL BASED GENERATOR SYSTEM

(71) Applicant: Vandette B. Carter, Yorktown Heights, NY (US)

(72) Inventor: Vandette B. Carter, Yorktown Heights, NY (US)

(*) Notice: Subject to any disclaimer, the term of this patent is extended or adjusted under 35 U.S.C. 154(b) by 27 days.

(21) Appl. No.: 16/198,748

(22) Filed: Nov. 21, 2018

(65) Prior Publication Data
US 2019/0157944 A1    May 23, 2019

Related U.S. Application Data

(60) Provisional application No. 62/589,105, filed on Nov. 21, 2017.

(51) Int. Cl.
| | |
|---|---|
| *H02K 35/02* | (2006.01) |
| *H02K 7/18* | (2006.01) |
| *H02K 1/02* | (2006.01) |
| *H02K 11/00* | (2016.01) |
| *B60K 6/22* | (2007.10) |
| *B60R 16/03* | (2006.01) |
| *B60L 53/00* | (2019.01) |

(52) U.S. Cl.
CPC .............. *H02K 7/1846* (2013.01); *B60K 6/22* (2013.01); *B60L 53/00* (2019.02); *B60R 16/03* (2013.01); *H02K 1/02* (2013.01); *H02K 11/0094* (2013.01); *H02K 35/02* (2013.01); *B60L 2220/44* (2013.01); *B60L 2220/50* (2013.01); *B60Y 2200/91* (2013.01); *B60Y 2200/92* (2013.01); *B60Y 2300/91* (2013.01)

(58) Field of Classification Search
CPC ............................. H02K 35/02; H02K 7/1846
See application file for complete search history.

(56) References Cited

U.S. PATENT DOCUMENTS

| | | | | |
|---|---|---|---|---|
| 2,505,770 | A * | 5/1950 | Hill ......................... | B64C 25/40 244/103 S |
| 4,405,872 | A * | 9/1983 | Thomas ............... | H02K 7/1853 290/1 R |
| 6,291,901 | B1 * | 9/2001 | Cefo ........................ | B60L 8/00 290/1 R |
| 8,531,072 | B2 * | 9/2013 | Wishart .................. | B62M 6/45 310/121 |
| 2017/0117774 | A1 * | 4/2017 | Lin ......................... | B60C 23/10 |

* cited by examiner

*Primary Examiner* — Dang D Le
(74) *Attorney, Agent, or Firm* — Ohlandt, Greeley, Ruggiero & Perle, L.L.P.

(57) ABSTRACT

A wheel having a tire, rim and for connection to an axle, contains a hollow circumferential solenoid tube, oriented in the same plane as the wheel, around the rim, with at least one permanent magnet situated within the hollow solenoid tube. The solenoid's wires are connected to a built-in battery which can situated inside of the wheel or the vehicle to store electricity for later use. The current generated may also be connected to transfer the electricity from the wheel-generator, to an external load, via a wire or wireless means; performed while the wheel is in motion or at rest.

20 Claims, 3 Drawing Sheets

WHEEL BASED GENERATOR SYSTEM

This application claims priority from, and the benefit of, provisional application Ser. No. 62/589,105 which was filed on Nov. 21, 2017, and which is incorporated herein for all purposes.

BACKGROUND OF THE DISCLOSURE

1. Field of the Disclosure

The present disclosure relates to the use of magnets to generate electricity by induction, derived from the rotation of a wheel and the force of gravity acting upon the magnet The technology may be regarded as a new form of renewable energy apparatus, harnessing the force of gravity to generate electricity when a wheel is in motion.

2. Description of the Related Art

During recent decades, electric motors have make their way into the automobile industry, whereby many major manufacturers have all pledged or have begun the development of pure electric vehicles, running on electric motors and batteries. Hybrid vehicles have become commonplace.

There exist systems for the recovery of energy by regenerative braking of a vehicle. Hybrid vehicles use this technology. However, hybrid vehicles are complex in design, and often require one or two so called motor-generators to provide additional drive power to assist a relatively small gasoline engine, and to provide regenerative braking. This adds to the weight and cost of the vehicle.

There is a need for a system to aid in regenerative braking and to reduce or eliminate at least one motor generator, to thus reduce cost, weight and complexity of the drive system of a vehicle.

SUMMARY OF THE DISCLOSURE

In general, an embodiment of the disclosure is directed to a wheel for a vehicle comprising a permanent magnet in the circumferential tube, the tube and magnet being configured so that the magnet can move within the tube; a conductor disposed on the tube so that when the wheel is rotated, the magnet will be acted upon by gravity to reach a point along the tube so that there continues to be relative motion between the magnet and the conductor to generate an electric current in the conductor; and electrical connections to the conductor so that current generated in the conductor is coupled to a device for receiving the electrical current.

The device for receiving the electrical current can comprise an electrical storage device associated with the wheel for storing electrical energy of the electrical current. The electrical storage device can be a chargeable battery mounted in the wheel.

The wheel can be combined with a mounting arrangement to rotationally mount the wheel on a vehicle, wherein the electrical connections connect the conductor to circuity of a vehicle on which the wheel is mounted The electrical connections can connect the conductor to a storage battery in the vehicle.

The circumferential tube can be evacuated of air. It can contain a lubricant for lubricating an inner surface of the circumferential tube and a surface of the magnet that comes into contact with the inner surface, to facilitate motion of the magnet along the circumferential tube, when he wheel is rotated. The lubricant can be a synthetic oil having 5w-30 viscosity characteristics.

The permanent magnet can comprise a rare earth metal. It can be a neodymium-iron-boron magnet. The permanent magnet produces a magnetic field strength of at least 1.4 Tesla. It may have an arcuate shape to match the curvature of the circumferential tube, and should be sized to allow movement of the permanent magnetic along the circumferential tube.

The electrical connections can comprise inductive power transfer circuitry. They can be a split ring assembly or a commutator assembly for the transfer of the electrical current The current is generated in the conductor when it is rotating in either a clockwise or counter-clockwise direction. The conductor is preferably a coil or solenoid disposed about the circumferential tube The permanent magnet remains within a lower half portion of the wheel when the wheel is rotating

ADVANTAGES OF THE DISCLOSED EMBODIMENT

The disclosed embodiment has the advantage of reliability, in that a vehicle can be equipped with one or more disclosed wheels, each providing a portion of the current required to be generated for the operation of the vehicle, including charging energy storage devices located in the wheels or in the vehicle on which the wheels are mounted. Thus, a failure of, for example, one of four wheels will only result in the loss of one quarter of the generated electricity, as opposed to all of it, when a single motor-generator or generator is used. Further, the weight and capacity of a motor generator in an existing design of a vehicle can be reduced in view of the electrical energy generated on one or more of the wheels disclosed herein. With the use of one or more of the wheels disclosed herein, it may be possible, in some vehicles, to eliminate completely a motor-generator. Finally, when a vehicle is traveling down a hill, dynamic regenerative braking of the vehicle can be enhanced greatly, by the use of one or more of the wheels disclosed herein, thus enhancing the recovery of potential energy, improving vehicle mileage, and enhancing safety by reducing the wear of traditional brake surfaces.

BRIEF DESCRIPTION OF THE DRAWINGS

A component or a feature that is common to more than one drawing is indicated with the same reference number in each of the drawings.

DESCRIPTION OF THE EMBODIMENT

Figures 1, 1A, 1B:
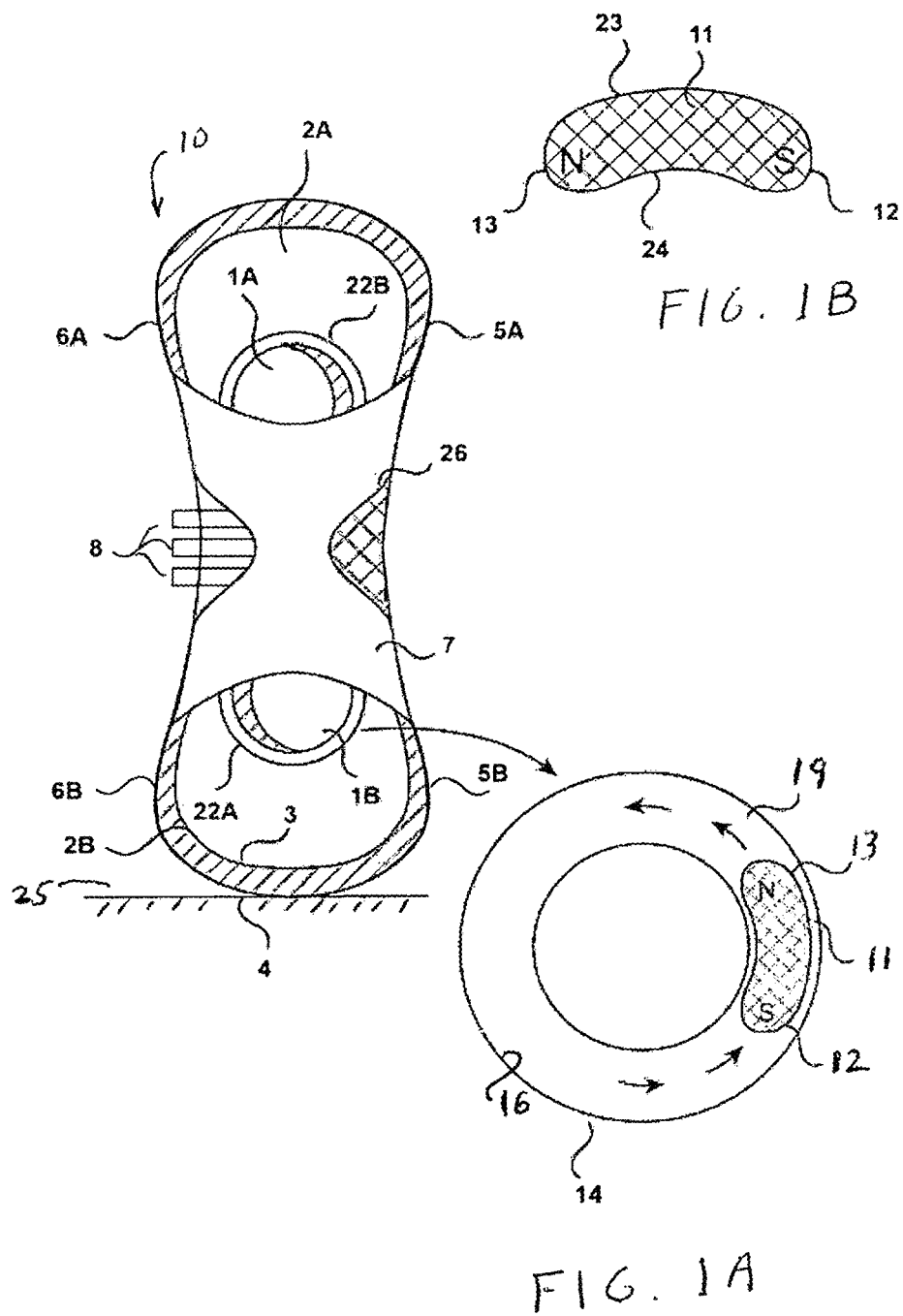
FIG. 1 is a cross-sectional view of an embodiment of the wheel disclosed herein.
FIG. 1A is a subassembly of the wheel of FIG. 1, shown in cross-section in a direction perpendicular to the direction of FIG. 1.
FIG. 1B illustrates the magnet shown in FIG. 1A on a scale enlarged with respect to the scale of FIG. 1A.

Referring to FIG. 1, FIG. 1A, FIG. 1B and FIG. 2, a wheel, shown generally as 10, is held on to a hub 26 of an axle of a vehicle (not shown) by a series of bolts 8, in a manner well know in the art. The wheel has a generally metal central portion 7 on which a tire 15 is mounted. Tire 15 has an outer wall as represented at 6A and 6B, an wall as represented at 5A and 5B, an inner surface 3 and an outer surface 4, Surface 4 is in contact with a road surface 25.

A hollow closed loop circumferential tube 14 is positioned around central portion 7 of wheel 10 so that it is in a plane parallel to the plane in which wheel 10 rotates and rotates with wheel 10. Circumferential tube 14 defines a closed donut shaped cavity 19 (FIG. 1A) represented by spaces 1A and 1B in FIG. 1. A coil represented at 22A and 22B is wrapped around circumferential tube 14, thus forming a solenoid. Current generated in the coil represented at 22A and 22B is conducted to a storage device by electrical connections 21A and 21B.

A permanent magnet 11, having curved surfaces 23 and 24 is disposed within circumferential tube 14. Magnet 11 has a south pole 12 and a north pole 13. Permanent magnet 11 can be, by way of example a rare earth metal magnet, such as neodymium-iron-boron magnet and have, also by way of example, a field strength of 1.4 Tesla, or greater as newer technology becomes available.

Figure 2:
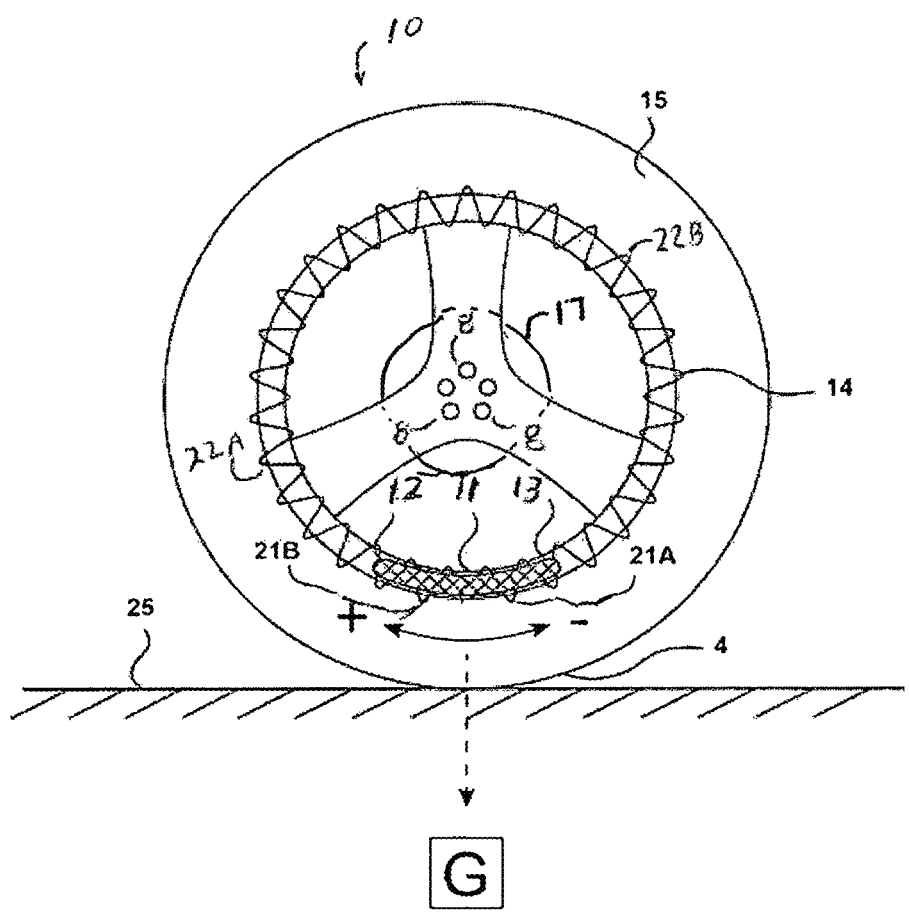
FIG. 2 is a cross-sectional side view of the wheel of FIG. 1.

When wheel 10 rotates as the vehicle to which it is mounted is moved, as illustrated in FIG. 2, the force of gravity G tends to keep permanent magnet 11 in the lower half of circumferential tube 14 of wheel 10. This produces relative motion between permanent magnet 11 and the solenoid or coil represented at 22A and 22B wrapped around circumferential tube 14, thus generating a voltage between electrical connections 21A and 21B. When a load is connected between electrical connections 21A and 21B, a current flows to that load as a result of a current flowing in the coil or solenoid.

To facilitate permanent magnet 11 staying in the lower half of circumferential tube 14 of wheel 10, the curved surfaces 23 and 24 of permanent magnet 11 can be made smooth so as to readily slide along the inner surface of circumferential tube 14. Further, a lubricant 16, such as a synthetic oil, possibly having the viscosity characteristics of a 5 W-30 lubricant, can coat the inner surface of circumferential tube 14. It is also possible to evacuate most of the air in circumferential tube 14 to help keep permanent magnet 11 in the lower half of circumferential tube 14. A very hard vacuum is not required.

The current generated can be used for any purpose including supplying electrical energy that can be stored in a battery for later use. The disclosed embodiment has the numerous advantages described above.

As shown in FIG. 2, the battery 17, if disposed within the wheel, is placed and shaped so as to maintain balance of the wheel when it rotates, and can be at the center of the wheel (or can extend circumferentially about the wheel).

Figure 3:
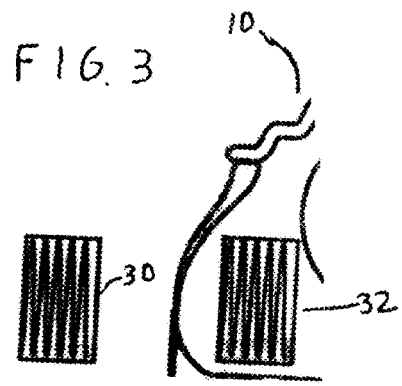
FIG. 3 shows inductive power transfer circuitry for transfer of power from the wheel.

FIG. 3 shows inductive power transfer circuitry 30 and 32 for transfer of power from the wheel 10.

Figure 4:
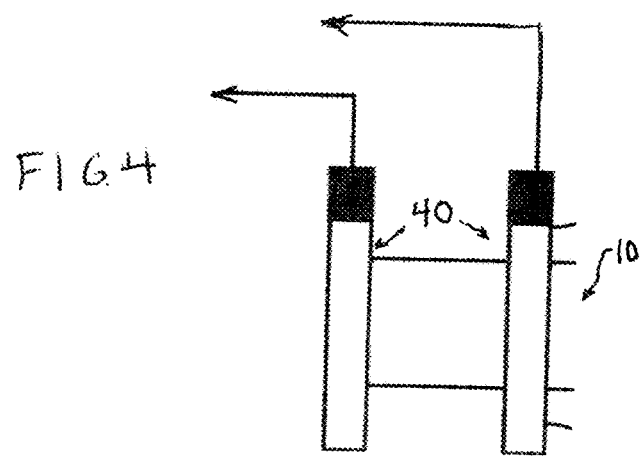
FIG. 4 shows a split ring assembly for the transfer of the electrical current from the wheel.

FIG. 4 shows a split ring assembly 40 for the transfer of the electrical current from the wheel 10.

Figure 5:
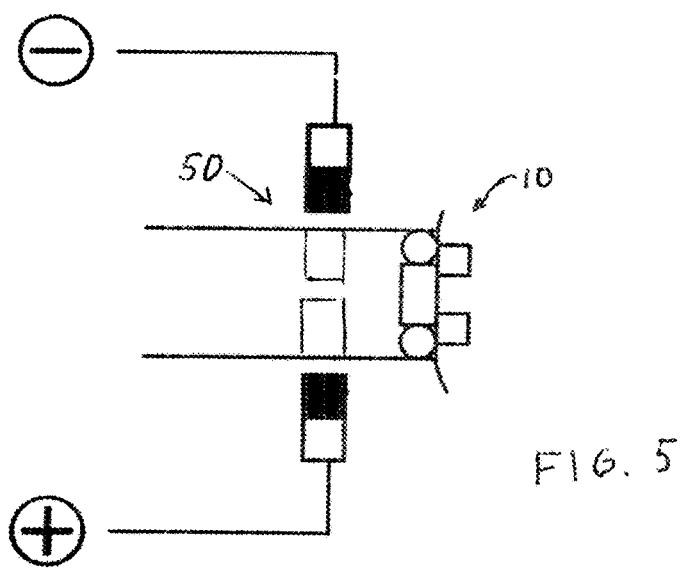
FIG. 5 shows a commutator assembly for the transfer of the electrical current from the wheel.

FIG. 5 shows a commutator assembly 50 for the transfer of the electrical current from the wheel 10.

The structures and techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof

What is claimed is:

1. A wheel for a vehicle comprising:
   a hollow closed loop circumferential tube, oriented in the plane of the wheel, and affixed to the wheel so as to rotate with the wheel;
   a permanent magnet in the circumferential tube, the tube and magnet being configured so that the magnet can move within the tube;
   a conductor disposed on the tube so that when the wheel is rotated, the magnet will be acted upon by gravity to reach a point along the tube so that there continues to be relative motion between the magnet and the conductor to generate an electric current in the conductor; and
   electrical connections to the conductor so that current generated in the conductor is coupled to a device for receiving the electrical current.

2. The wheel of claim 1, wherein the device for receiving the electrical current comprises an electrical storage device associated with the wheel, for storing electrical energy of the electrical current.

3. The wheel of claim 2, where the electrical storage device is a chargeable battery mounted in the wheel.

4. The wheel of claim 1, in combination with a mounting arrangement to rotationally mount the wheel on a vehicle, wherein the electrical connections connect the conductor to circuity of a vehicle on which the wheel is mounted.

5. The wheel of claim 1, wherein the electrical connections connect the conductor to a storage battery in the vehicle.

6. The wheel of claim 1, wherein the circumferential tube is evacuated of air.

7. The container of claim 1, wherein the circumferential tube contains a lubricant for lubricating an inner surface of the circumferential tube and a surface of the magnet that comes into contact with the inner surface, to facilitate motion of the magnet along the circumferential tube, when said wheel is rotated.

8. The wheel of claim 7, wherein the lubricant is a synthetic oil.

9. The wheel of claim 7, wherein the lubricant has 5w-30 viscosity characteristics.

10. The wheel of claim 1, wherein permanent magnet is a neodymium-iron-boron magnet.

11. The wheel of claim 1, wherein permanent magnet comprises a rare earth metal.

12. The wheel of claim 1, wherein the permanent magnet produces a magnetic field strength of at least 1.4 Tesla.

13. The wheel of claim 1, wherein the permanent magnet is of arcuate shape to match the curvature of the circumferential tube, and is sized to allow movement of the permanent magnetic along the circumferential tube.

14. The wheel of claim 1, wherein the conductor is wound around the circumferential tube so as to form a solenoid winding.

15. The wheel of claim 1, wherein the electrical connections comprise inductive power transfer circuitry.

16. The wheel of claim 1, wherein the electrical connections comprise a split ring assembly for the transfer of the electrical current.

17. The wheel of claim 1, wherein the electrical connections comprise a commutator assembly for the transfer of the electrical current.

18. The wheel of claim 1, wherein current is generated in the conductor when it is rotating in either a clockwise or counter-clockwise direction.

19. The wheel of claim 1, wherein the permanent magnet remains within a lower half portion of the wheel when the wheel is rotating.

20. The wheel of claim 1, wherein the conductor is a solenoid disposed about the circumferential tube.

* * * * *